US 6,490,356 B1

(12) United States Patent
Beuque

(10) Patent No.: US 6,490,356 B1
(45) Date of Patent: Dec. 3, 2002

(54) BROADCAST RECEIVING SYSTEM COMPRISING A COMPUTER AND A DECODER

(76) Inventor: Jean-Bernard Gerard Maurice Beuque, 132, rue Victor Hugo, F-92270 Bois-Colombes (FR)

( * ) Notice: Subject to any disclaimer, the term of this patent is extended or adjusted under 35 U.S.C. 154(b) by 0 days.

(21) Appl. No.: 09/400,446

(22) Filed: Sep. 21, 1999

Related U.S. Application Data

(63) Continuation of application No. PCT/EP98/01607, filed on Mar. 19, 1998.

(30) Foreign Application Priority Data

| Mar. 21, 1997 | (EP) | ............................................. 97400650 |
| Nov. 3, 1997 | (EP) | ............................................. 97402619 |

(51) Int. Cl.[7] ........................... H04N 7/14; H04N 7/173
(52) U.S. Cl. ....................... 380/239; 380/216; 380/240; 380/242; 713/153; 348/9; 348/10; 348/12; 348/13
(58) Field of Search ................................ 380/216, 217, 380/239, 240, 242; 705/35; 713/153, 154; 348/9, 10, 11, 12, 13

(56) References Cited

U.S. PATENT DOCUMENTS

| 4,965,825 A | * | 10/1990 | Harvey et al. ................. 380/9 |
| 5,488,412 A | * | 1/1996 | Majeti et al. ................. 348/10 |
| 5,502,499 A | * | 3/1996 | Birch et al. ................. 348/523 |
| 5,521,979 A | * | 5/1996 | Deiss ......................... 380/20 |
| 5,583,562 A | | 12/1996 | Birch et al. ................... 348/12 |
| 5,602,920 A | | 2/1997 | Bestler et al. ................ 380/49 |
| 5,870,474 A | * | 2/1999 | Wasilewski et al. .......... 380/21 |
| 6,157,721 A | * | 12/2000 | Shear et al. ................. 380/255 |

FOREIGN PATENT DOCUMENTS

| WO | WO 89/02682 | 3/1989 | ............ H04K/7/00 |
| WO | WO 95/27348 | 10/1995 | ............ H04H/1/02 |
| WO | WO 96/37996 | 11/1996 | ............ H04N/5/44 |
| WO | WO 98/00975 | 1/1998 | .......... H04N/7/173 |

OTHER PUBLICATIONS

Copy of International Search Report issued Jul. 22, 1998, Application No. PCT/EP98/01607, 3 pages.

* cited by examiner

*Primary Examiner*—Justin T. Darrow
(74) *Attorney, Agent, or Firm*—Sterne, Kessler, Goldstein & Fox, P.L.L.C.

(57) ABSTRACT

A combined computer and decoder system for receiving broadcast digital data transmissions, characterized in that the decoder (2020) comprises a routing means (2032), broadcast digital data received at the decoder (2020) and destined for the computer (2027) being identified and routed to applications within the computer by said routing means. The computer (2027) may further include control means (2038) for controlling the configuration of the decoder, such as the selected channel frequency of the decoder.

19 Claims, 3 Drawing Sheets

BROADCAST RECEIVING SYSTEM COMPRISING A COMPUTER AND A DECODER

CROSS-REFERENCE TO OTHER APPLICATIONS

This application is a continuation of International Patent Application No. PCT/EP98/01607, filed Mar. 19, 1998, which claimed priority to International Patent Application No. PCT/EP97/02110, filed Apr. 25, 1997, and European Application Nos. 97400650.4, filed Mar. 21, 1997, and 97402619.7, filed Nov. 3, 1997.

The present invention relates to a combined computer and decoder system for receiving broadcast digital transmissions. The invention equally extends to each of the elements of a computer and a decoder adapted for use in such a system.

RELATED ART

Broadcast transmission of digital data is well-known in the field of pay TV systems, where scrambled audiovisual information is sent, usually by a satellite or satellite cable link, to a number of subscribers, each subscriber possessing a decoder or receiver/decoder capable of descrambling the transmitted program for subsequent viewing. Terrestrial digital broadcast systems are also known.

More recently, it has been proposed to use such digital broadcast technology for the distribution of other types of digital data and information. Broadcast transmission possesses a number of advantages in comparison with other telecommunication networks, such as the telephone network, notably in relation to increased bandwidth, reliability of transmission etc. For this reason, a number of systems have been suggested using a cable or satellite link to enable access to the internet, for example.

At present, the provision of such services is at a very early stage and conventional hardware and software systems that have been proposed in this regard are often ill-adapted for the applications in question. In the case of a digital television receiver/decoder, for example, the system is usually piloted by means of a television style remote control device. Whilst a remote control of this type is usually sufficient for television applications (channel changing, selection of programme guides or menus), more sophisticated applications such as an internet browser will usually require a keyboard for ease of operation. Similarly, depending on the application in question, the available memory of the decoder may be inadequate for effective operation.

For these reasons, a combination PC/decoder arrangement may be envisaged. However, whilst the theoretical advantages of such a combination may be foreseen, the practical details of the implementation of such a system can give rise to a number of other problems, in particular in respect of the communication of information between the two, how the decoder is configured to handle different types of data, how the decoder changes between different modes of operation (e.g. television/internet modes) etc.

SUMMARY OF THE INVENTION

It is an object of the present invention to provide a practically realisable decoder/computer combination that enables digital data to be downloaded from the decoder to the computer whilst avoiding any potential operational problems arising from interaction between the elements of the system.

According to the present invention there is provided a combined computer and decoder system for receiving broadcast digital data transmissions, characterised in that the decoder comprises a routing means, broadcast digital data received at the decoder and destined for the computer being identified and routed to applications within the computer by said routing means.

The presence of a routing means within the decoder enables the decoder to simply and effectively identify messages intended for applications within the decoder and permits the decoder to reject, for example messages having another destination.

In a computer/decoder arrangement, the majority of data received via the decoder during operations in this mode will be routed to the computer for further processing. However, in certain cases, data may be routed to applications within the decoder itself.

For example, the decoder may include an application for surveillance of transmission. In one embodiment, the application may monitor the continuity of the transmitted messages, for example, by checking the arrival of each message in a numbered sequence of messages. In this case, the data representing the message number is passed to the surveillance application.

Alternatively, certain standard test messages may be passed to a stack within the memory of the decoder to permit the decoder to evaluate the quality of the transmission channel based on the received message composition.

Received broadcast data may also be used by decoder based applications to modify the routing table, as will be described below.

In one particularly preferred embodiment, the decoder further includes an application within the decoder adapted to configure operating parameters of the decoder including, inter alia, the routing means. This configuration application and the parameters thereof may be loaded into the decoder or modified by instructions received from the computer. Alternatively, or in addition, the configuration application together with data representing the initial configuration parameters may be stored in the memory of the decoder during the manufacture of the decoder, to permit the auto-configuration of the decoder when the decoder is powered up.

Advantageously, the configuration application may further be loaded into the decoder or modified by instructions received in the transmitted broadcast data. This realisation enables the decoder to be reprogrammed at a distance by instructions contained in the broadcast data flow.

In practice, the routing means may be adapted to identify and route messages according to characteristics of the message data received. In one embodiment, broadcast data received in the MPEG format by the decoder is routed by the routing table according to the value of the packet ID header.

Broadcast digital data routed to the computer may simply comprise data to be processed by applications previously installed in the computer, e.g. applications stored on a diskette and loaded into the computer. However, in one embodiment, the broadcast data may also comprise the applications themselves, adapted to be routed to the computer for execution within the computer. In this way, downloading at a distance of applications into the computer from a remote server may be carried out.

In the case where the transmitted data is non-confidential and/or provided by a free service provider (as may be the case for certain internet applications) the data may be transmitted in clear over the air. However, in the case where the transmitted data sent to the computer is proprietary or otherwise valuable, means for restricting access to the data is desirable.

Preferably, the decoder further includes decryption means adapted to decrypt digital data broadcast in a scrambled form for subsequent routing in decrypted form to the computer. In one realisation, scrambled data is transmitted together with a control word for descrambling of the data, the control word itself being encrypted by a so-called exploitation key and transmitted in encrypted form. The decoder possesses an equivalent of the exploitation key to decrypt the control word and descramble the data. These and other such security measures known from the decoding of television data may be advantageously used in the present system to restrict access to data intended for applications within the computer.

In the above embodiments, operation of the routing means has been discussed mainly in relation to data received via the broadcast transmission link destined for the computer or decoder. However, as will be appreciated, the routing means may also operate to route digital data received from other sources, such as applications within the decoder and/or within the computer and data received via any of the other input ports of the decoder, such as a serial/parallel link etc.

In the case where the computer/decoder combination is to be used in an interactive application, such as an internet application, the computer may be linked to a modem such that messages may be sent from the computer to a server at the broadcast centre or elsewhere to demand, for example, the transmission of a defined home page or the like. However, this may increase the cost of the system to the user.

Preferably, the decoder further comprises a modem, the routing means being adapted to route selected messages received from an application within the computer to the modem. In practice, nearly all receiver/decoders intended for the digital television market possess a modem link and the cost of the modem is absorbed in the cost of the decoder itself.

As mentioned in the preamble of this application, problems of communication and conflicting commands may arise with a decoder and computer combination. In a particularly preferred embodiment of the invention it is foreseen that the operation of the decoder is at least in part controlled by control signals sent from a control means within the computer.

By transferring control of the decoder to the computer, the operation of the system can be more easily managed. For example, in one embodiment, the computer controls the operation of the tuner within the decoder to select the channel frequency for reception of digital data to be downloaded to the computer. Since this information may be known to the application within the computer, but not to the decoder, automatic selection of channel frequency by the application considerably simplifies the setting up of the system for an operator.

Potential conflicts between instructions sent to the decoder by other means, such as the decoder remote control, and instructions originating from the computer can also be avoided by such a transfer of control.

For example, the computer may be adapted to send a control signal to the decoder to render the decoder unresponsive to selected commands received from selected other decoder inputs, such as a change channel command from the decoder remote control. In some embodiments the decoder may still be enabled to receive commands from other input sources, for example commands received in the broadcast data flow.

As will be understood, the computer/decoder set-up of the present invention may be used in a number of commercial applications, ranging from mass market internet type browser applications to more specialised applications intended for corporate organisations, where the broadcast link is used to send proprietary data.

One example envisaged is for the transmission of financial information, notably stock price information, from a central financial centre to a number of remote terminals. In such an application, the customer benefits from the increased channel capacity as compared to standard telecom networks together with secure protection of sensitive data by means of an encrypted transmission (where provided). In this embodiment, the decoder will serve exclusively as a channel for information destined for the computer and will not handle television transmissions.

In contrast, where the decoder is to be used in the context of a mass market product, it is obviously advantageous that the decoder may also be used in its normal configuration, i.e. to receive and process digital television signals. In this case, the system further comprises a television display, the decoder being adapted to process received broadcast audio-visual data subsequently sent to the television display.

The present invention further extends to a computer and decoder for use in a system as described above.

Whilst the application refers to <<receiver/decoders>> and <<decoders>> it will be understood that the present invention applies equally to embodiments having a receiver integrated with the decoder as to a decoder unit functioning in combination with a physically separate receiver. Such a decoder may be of the kind used in any satellite, terrestrial, cable etc digital broadcast system and may include other multimedia type capabilities.

There will now be described, by way of example only, an embodiment of the present invention, in which:

DETAILED DESCRIPTION OF THE PREFERRED EMBODIMENTS

Figure 1:
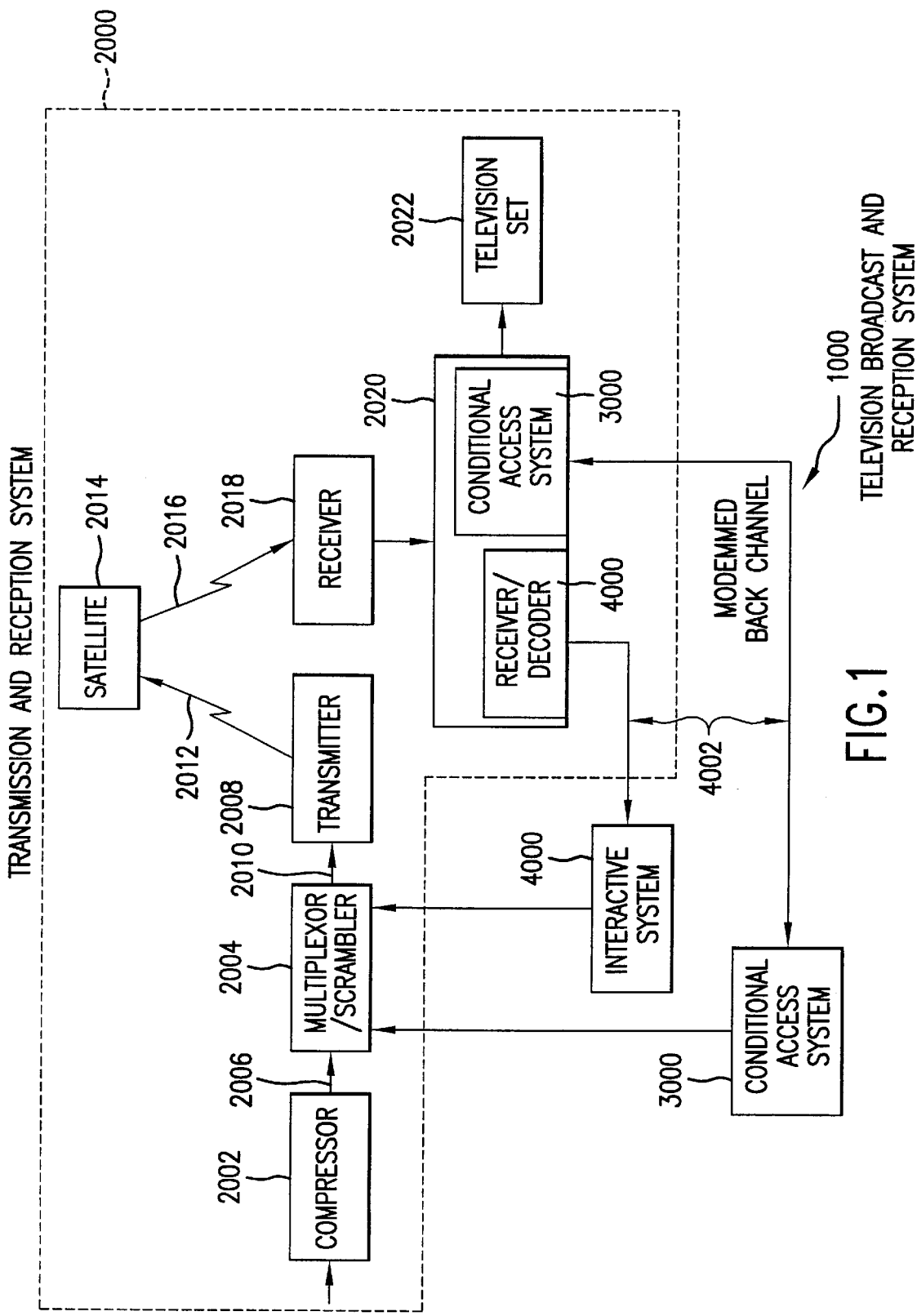
FIG. 1 shows the overall architecture of a digital transmission system, as known from the field of digital television.

An overview of a digital television broadcast and reception system 1000 adaptable to the present invention is shown in FIG. 1. This includes a mostly conventional digital transmission and reception system 2000, which uses the known MPEG-2 compression system to transmit compressed digital signals. In more detail, the MPEG-2 compressor 2002 in a broadcast centre receives a digital signal stream e.g. a stream of video signals. The compressor 2002 is connected to a multiplexer and scrambler 2004 by linkage 2006.

The multiplexer 2004 receives a plurality of further input signals, assembles one or more transport streams and transmits compressed digital signals to a transmitter 2008 of the broadcast centre via linkage 2010, which can of course take a wide variety of forms including telecom links. The transmitter 2008 transmits electromagnetic signals via uplink 2012 towards a satellite transponder 2014, where they are electronically processed and broadcast via notional downlink 2016 to earth receiver 2018, conventionally in the form of a dish owned or rented by the end user.

The signals received by receiver 2018 are transmitted to an integrated receiver/decoder 2020 owned or rented by the end user and connected to the end user's television 2022. The receiver/decoder 2020 decodes the compressed MPEG-2 signal into a television signal for the television set 2022. Whilst the present application refers to "receiver/decoders" and "decoders" it will be understood that the present invention applies equally to embodiments having a receiver integrated with the decoder as to a decoder unit functioning in combination with a physically separate receiver.

A conditional access system 3000 is connected to the multiplexer 2004 and the receiver/decoder 2020, and is located partly in the broadcast centre and partly in the decoder. It enables the end user to access digital broadcasts from one or more broadcast suppliers. A smart card, capable of decrypting messages relating to commercial offers (that is, on or several television programmes or data services sold by the broadcast supplier), can be inserted into the receiver/decoder 2020.

Transmission of scrambled data is well-known in the field of pay TV systems. Typically, scrambled data is transmitted together with a control word for descrambling of the data, the control word itself being encrypted by a so-called exploitation key and transmitted in encrypted form.

The scrambled data and encrypted control word are then received by the decoder 2020 having access to an equivalent of the exploitation key stored on a smart card inserted in the decoder to decrypt the encrypted control word and thereafter descramble the transmitted data. A paid-up subscriber will receive in a broadcast monthly ECM (Entitlement Control Message) the exploitation key necessary to decrypt the encrypted control word so as to permit viewing of the transmission.

An interactive system 4000, also connected to the multiplexer 2004 and the receiver/decoder 2020 and again located partly in the broadcast and partly in the decoder, enables the end user to interact with various applications via a modemmed back channel 4002.

The above type of system is more generally known in the context of transmission of digital audiovisual data associated with a broadcast digital television transmission. However, as will be described below in more detail, the system will be used to transmit data intended for ultimate use in a computer linked to the decoder in question. This data may be transmitted instead of, or as well as digital television data, depending on, for example, whether the system is intended for a consumer or professional market.

In the case where television signals are not to be distributed, the MPEG compressor 2002 used to process the digital video stream may be omitted. Information passed by the server 4000 for multiplexage by the multiplexer 2004 may be pre-formatted in MPEG format by the server or transformed by a dedicated server (not shown) for subsequent transmission.

Figure 2:
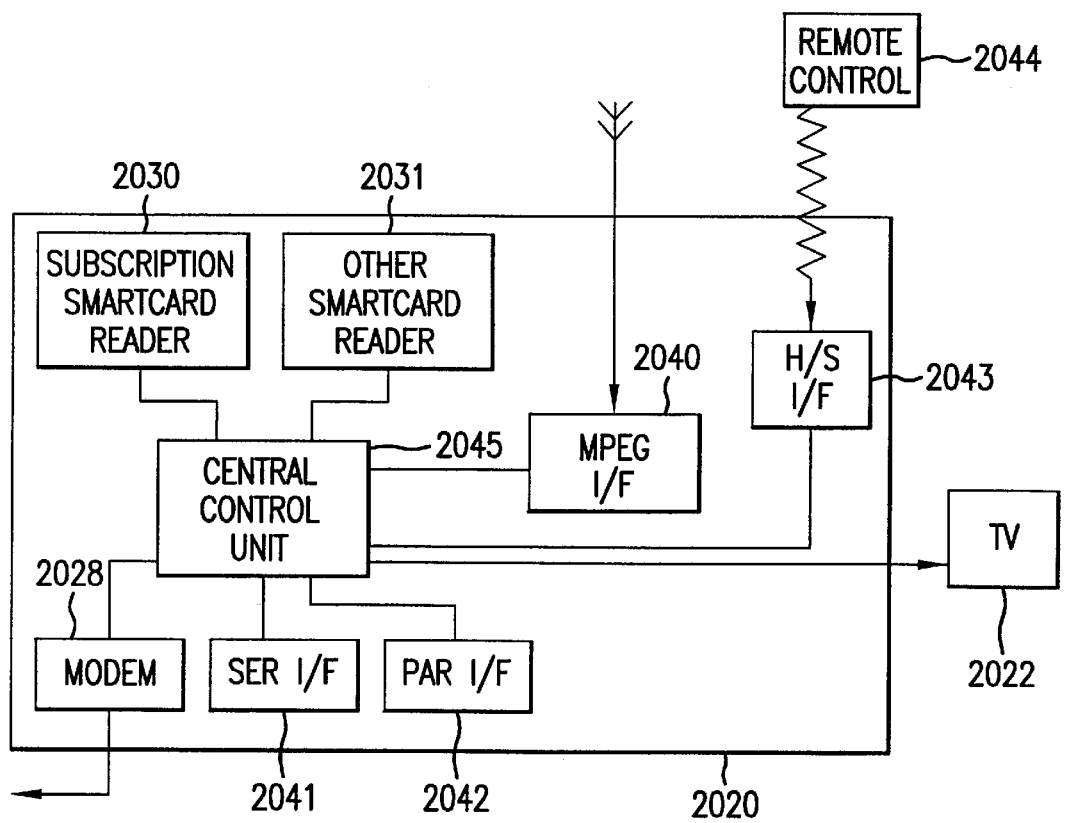
FIG. 2 shows an overview of the elements of a receiver/decoder.

Referring to FIG. 2, the elements of a receiver/decoder 2020 or set-top box for use in a digital broadcast system and adapted to be used in the present invention will now be described. As will be understood, the elements of this decoder are largely conventional and their implementation will be within the capabilities of one skilled in the art.

As shown, the decoder 2020 is equipped with several interfaces for receiving and transmitting data, in particular an MPEG tuner and demultiplexer 2040 for receiving broadcast MPEG transmissions, a serial interface 2041, a parallel interface 2042, and a modem 2028 for sending and receiving data via the telephone network. In this embodiment, the decoder also includes a first and second smart card reader 2030 and 2031, the first reader 2030 for accepting a subscription smart card containing decryption keys associated with the system and the second reader 2031 for accepting bank and other cards.

The decoder also includes a receiver 2043 for receiving infra-red control signals from a handset remote control 2044 and a Peritel output for sending audiovisual signals to a television 2022 connected to the decoder (if present).

Processing of digital signals received via the interfaces and generation of digital output signals is handled by a central control unit 2045. The software architecture of the control unit within the decoder may correspond to that used in a known decoder and will not be described here in any detail. It may be based, for example, on a virtual machine interacting via an interface layer with a lower level operating system implemented in the hardware components of the decoder. In terms of the hardware architecture, the decoder will be equipped with a processor, memory elements such as ROM, RAM, FLASH memory etc. as in known decoders.

Applications processed by the control unit 2045 may be resident applications stored in the ROM or FLASH of the decoder or applications broadcast and downloaded via the MPEG interface 2 of the decoder. Applications can include program guide applications, games, interactive services, teleshopping applications, as well as initiating applications to enable the decoder to be immediately operational upon start-up and applications for configuring the decoder. Applications are stored in memory locations in the decoder and represented as resource files comprising graphic object description files, unit files, variables block files, instruction sequence files, application files, data files etc.

Conventionally, applications downloaded into the decoder via the broadcast link are divided into modules, each module corresponding to one or more MPEG tables. Each MPEG table may be divided into a number of sections. For data transfer via the serial and parallel ports, modules are also split into tables and sections, the size of the section depending on the channel used.

In the case of broadcast transmission, modules are transported in the form of data packets within respective types of data stream, for example, the video data stream, the audio data stream, a text data stream. In accordance with MPEG standards each packet is preceded by a Packet Identifier (PID) of 13 bits, one PID for every packet transported in the MPEG stream. A programme map table (PMT) contains a list of the different streams and defines the content of each stream according to the respective PID. A PID may alert the device to the presence of applications in the data stream, the PID being identified by the PMT table.

Figure 3:
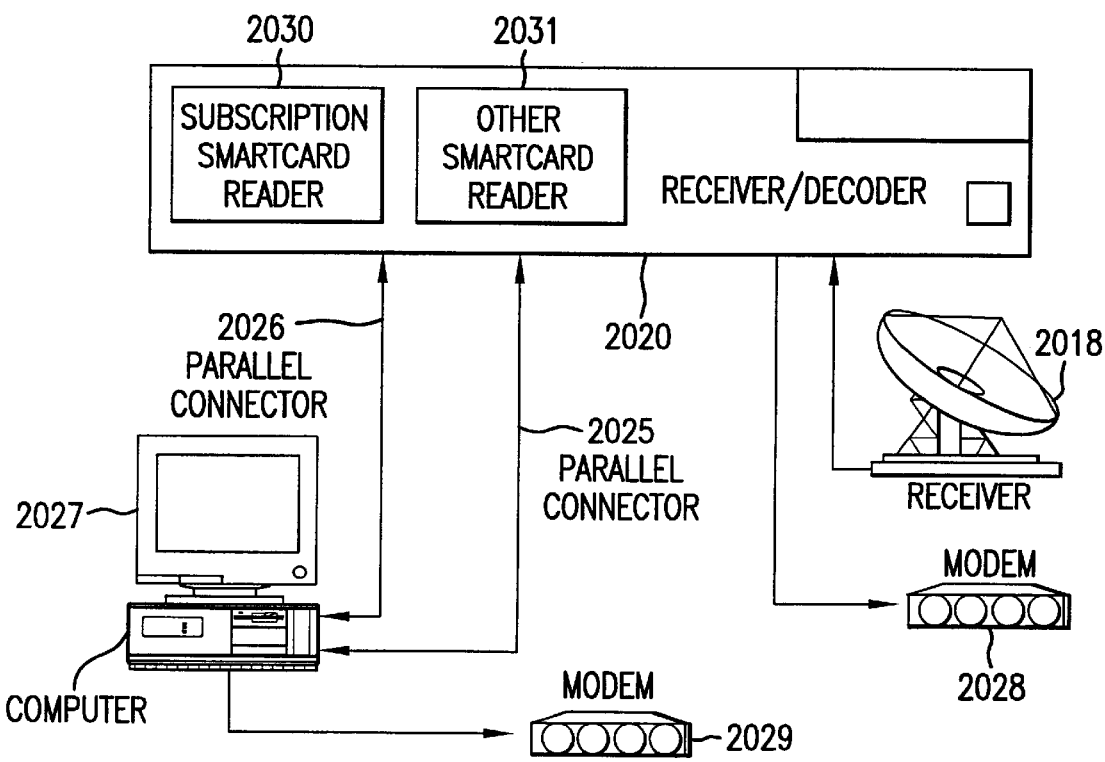
FIG. 3 shows the hardware architecture of a combined receiver/decoder and computer system according to this embodiment of the invention.

Referring now to FIG. 3, the hardware architecture of the decoder/computer combination according to the present invention will now be described. The decoder 2020 includes an input connection from the receiver 2018 and is also connected via serial and/or parallel connectors 2026, 2027 to a computer 2027 in the form of a PC. In alternative embodiments, the computer 2027 may be defined by any number of different computer devices (Unix workstation etc) capable of receiving data and executing installed applications.

Associated with the decoder is an integrated modem device 2028. Although this has been represented in this figure as being a distinct item, the modem 2028 will normally be integrated within the body of the decoder. The PC computer 2027 may also include a link to a modem 2029, usually provided separately from the computer. As will be discussed, in certain embodiments the modem 2029 may be rendered superfluous by the decoder modem 2028.

As described above, the decoder includes smart card reader slots 2030, 2031 for accepting credit or subscription cards associated with the decoder. Data transmissions sent within the system may be encrypted or scrambled, the subscription card associated with the decoder possessing the necessary key or keys for decrypting the transmissions.

Figure 4:
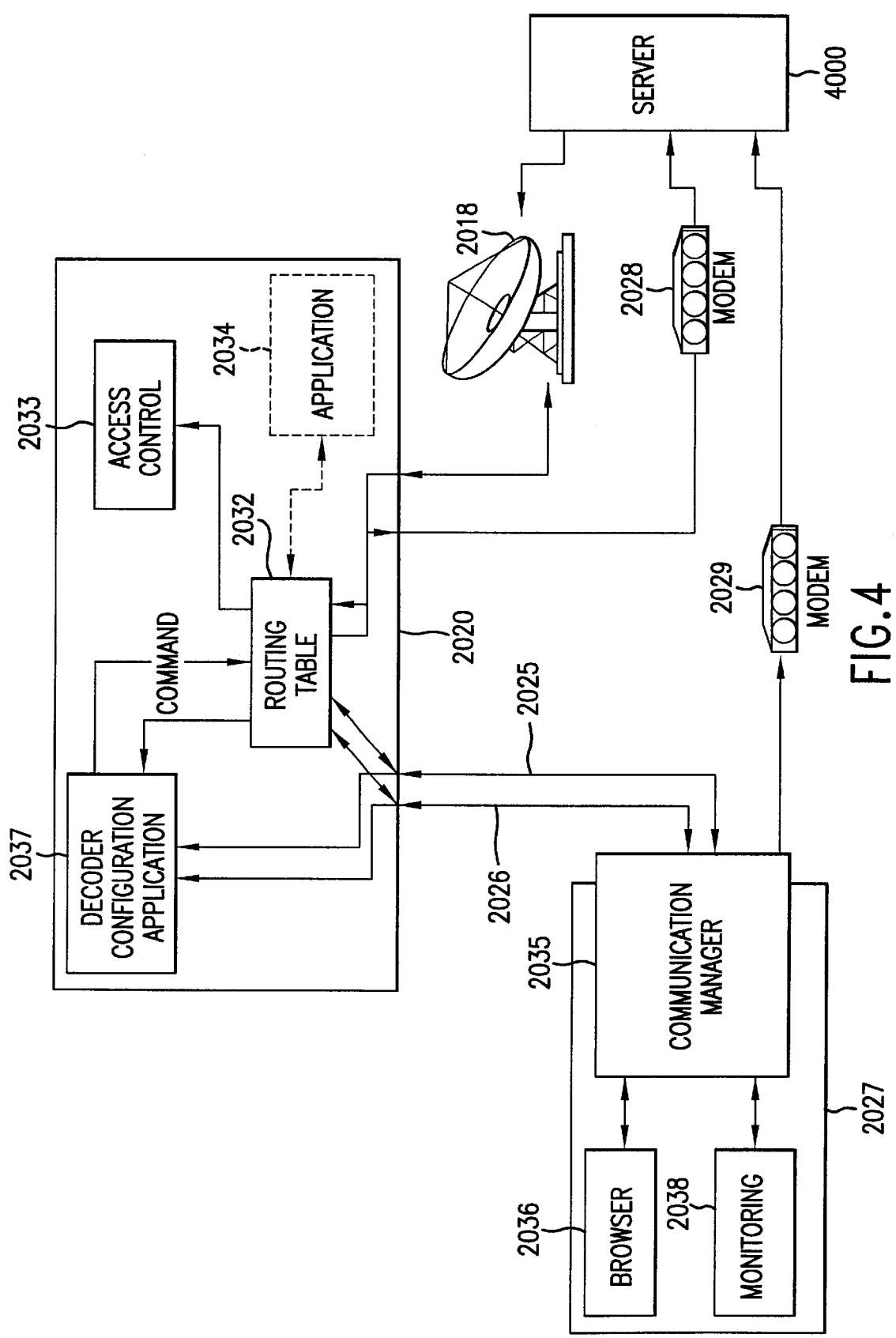
FIG. 4 shows the software architecture of the system of FIG. 3.

Referring now to FIG. 4, the logical architecture of the system will now be described. As will be understood, the functional elements internal of the decoder and PC are in practice implemented by means of programmed software modules executed by microprocessor devices with relation to data stored in RAM, EEPROM, FLASH etc memory means within the devices. Alternatively, some functions may be implemented by dedicated hardware ASICs, for example.

Digital broadcast data supplied by the server 4000 and captured by the receiver 2018 passes to a routing table application 2032 within the decoder 2020. An access control application 2033 acts to decrypt the scrambled MPEG data to recover descrambled message packets. These message packets are routed by the routing table either to applications 2034 within the decoder or to applications within the PC computer 2027 via a selected parallel or serial channel 2025, 2026. Certain messages may also be sent to a decoder configuration application 2035 which controls, inter alia, the configuration of the routing table, as will be described in more detail below.

The selection and subsequent routing of messages may be carried out on the basis of the PID or Packet ID of the MPEG message packet, or on any other header section or indicator associated with the received message packet. Data destined for the computer 2027 is sent via a parallel or serial connection 2025, 2026 to a communication manager 2035 adapted to manage communications via the serial and parallel ports on the computer.

In the case of applications 2034 within the decoder 2020, these can include, for example, a transmission surveillance application adapted to receive packet messages corresponding to a standard test format and to evaluate the quality of the communication channel based on the correct or incorrect reception of all or part of the test packet message. This can be used, for example, when the receiver is being tuned to the channel frequency on which the data in question is sent. In addition or alternatively, a continuity counter application may be provided to monitor the arrival of each message in a numbered sequence.

Data received by the decoder and sent to the computer 2027 may include simple data adapted to be processed in an existing application within the computer, for example data for a web browser 2036. In other proprietary commercial applications, the data may be, for example, stock data adapted to be processed and displayed by a specialised application. This data may be updated in response to commands received from the computer 2027 or on an automatic basis at periodic intervals.

The configuration of the routing table 2032 is in fact controlled by a configuration application 2037 within the decoder. Part or all of the configuration application may be installed in the memory of the application during manufacture, such that the decoder includes a predetermined set of routing instructions to enable the decoder to handle routing of packet messages at the moment of start up of the decoder.

In addition, or alternatively, the configuration application may be installed or modified by packet messages received via the MPEG data flux and dispatched within the decoder by the router 2032 in the first instance according to an initial predetermined routing configuration. In this way, remote programming and reprogramming of the decoder becomes possible.

More significantly, the decoder configuration application 2037 may be also configured by control instructions sent from a monitoring application 2038 within the PC computer 2027. As with all PC applications, this application may be loaded into the PC by diskette or via packet messages received by the decoder and re-routed to the PC. The monitoring application can then carry out the necessary configuration of the routing table 2032 and its parameters to enable the decoder to correctly handle and route messages intended for the browser application 2035 or any other application within the PC or decoder.

Further aspects of the decoder configuration generally are also handled by the application 2037 and can be controlled by control signals from the monitoring application 2038. In this way the PC is enabled to take all necessary steps to correctly configure the decoder for the reception of data messages destined for an application within the PC. In particular, the monitoring application 2038 may be adapted to send control messages to the application 2037 to adjust the tuning of the decoder to receive messages sent on a particular communication frequency.

The monitoring application can also configure the decoder such that it will not accept other input signals from some or all other sources, for example change channel requests received from a remote control associated with the decoder. Other control parameters may equally be adjusted as desired.

The advantages of this particular embodiment will be understood. In general, in a PC/decoder set up, the operator will be driving the system from the PC terminal. In such a case, the system should be generally unresponsive to commands to the system via the decoder (with the possible exception of commands received via the MPEG flow, of course). This realisation of the invention prevents such conflicts from arising and avoids, for example, the possibility of the operator inadvertently changing channels by the decoder remote control during operation of a PC application.

Equally, the advantage of controlling the decoder from the PC is that a new application loaded into the PC can automatically reconfigure a standard decoder, for example, one normally set up to receive a known television channel. By means of the monitoring application within the PC, the decoder may be controlled to search out the channel associated with transmission of data for the new application and to download and route such data to the application within the PC computer. In this way, the user is spared from having to adjust the decoder himself to the correct channel since this will be automatically carried out by the PC.

In the embodiments of FIGS. 3 and 4, the system is configured for a largely professional or commercial type of service, in which the decoder is used exclusively to process data related to applications used within the PC. In such services, the decoder will not be used to handle TV data and a television display will not be needed.

Nevertheless, in some realisations, the decoder may also be used to carry out its "normal" functions, namely processing digital TV data, from time to time. In such case, a television will be connected to the decoder within the system. In this set-up, the decoder may change to and from modes as desired by the user.

As mentioned above, in the case where the PC has taken control of the decoder, for example to receive downloaded web page data for use in a browser application, the decoder will be unresponsive to commands received via the decoder remote control etc until such time as the user has terminated the session by a command from the PC.

The above discussion has concentrated on the routing of packet data received via the MPEG flow. As will be appreciated, the routing table may also be used to direct messages received from any of the ports of the device. In particular, in the case of interactive applications within the PC, for example, a web browser 2036, commands may also need to be sent from the PC application to the server 4000.

In the simplest embodiment, the PC may be connected via a standard modem connection 2029 to the server 4000. Requests for information from the PC 2027 and sent via the modem 2029 will be replied to by information sent by the server via the satellite or broadcast link 2018. This realisation presupposes the presence of a modem within or associated with the computer 2027.

In an alternative arrangement, messages destined for the server 4000 from the PC 2027 may be sent via the serial/parallel lines 2025, 2026 to be routed via the routing table 2032 to the modem 2028 integral within the decoder and, thereafter, sent to the server 4000. Since all decoders are in practice manufactured with such a modem, there is no extra cost for the consumer with this configuration.

The modem 2028 may of course also be used to dispatch messages from applications within the decoder, for example, messages from the application 2034 used to survey the quality of transmissions on the selected channel or from the access control application 2033. Exceptionally, messages may also be sent from the server to the decoder and/or PC via either of the modem links 2028, 2029.

What is claimed is:

1. A combined computer and decoder system for receiving broadcast digital data transmissions, wherein the decoder comprises routing means for identifying broadcast digital data received at the decoder, the routing means being configured to route received data identified as destined for the computer to applications within the computer, the decoder further comprising a configuration application adapted to configure said routing means.

2. A combined computer and decoder system as claimed in claim 1, wherein said routing means is further adapted to route data identified as destined for the decoder to applications within the decoder.

3. A combined computer and decoder system as claimed in claim 1, wherein the computer comprises control means for sending control signals to the decoder to control at least in part operation of the decoder.

4. A combined computer and decoder as claimed in claim 3, wherein the control means is adapted to send control signals to the decoder to configure the configuration application.

5. A combined computer and decoder system as claimed in claim 3, wherein the control means is configured to control the operation of a tuner within the decoder to select the channel frequency for reception of digital data to be downloaded to the computer.

6. A combined computer and decoder system as claimed in claim 3, wherein the control means is configured to send a control signal to the decoder to render the decoder unresponsive to selected commands from selected other decoder inputs.

7. A combined computer and decoder system as claimed in claim 1, wherein at least part of the configuration application is stored in the memory of the decoder during the initial manufacture of the decoder.

8. A combined computer and decoder system as claimed in claim 1, wherein at least part of the configuration application is loaded into the decoder or modified by instructions received in the broadcast digital data.

9. A combined computer and decoder system as claimed in claim 1, wherein the routing means is adapted to identify and route broadcast digital data received at the decoder according to characteristics of the received data.

10. A combined computer and decoder system as claimed in claim 1, wherein the routing means is configured to route broadcast digital data received in the MPEG format at least in part according to a value of a packet ID header.

11. A combined computer and decoder system as claimed in claim 1, wherein the routing means is configured to route to the computer broadcast digital data to be processed by applications previously installed in the computer and/or applications to be installed and executed within the computer.

12. A combined computer and decoder system as claimed in claim 1, wherein the decoder further comprises decryption means adapted to decrypt digital data broadcast in a scrambled form for subsequent routing in decrypted form to the computer.

13. A combined computer and decoder system as claimed in claim 12, wherein the decoder possesses an equivalent of an exploitation key for use in decrypting an encrypted control word within the broadcast digital data for subsequent use in descrambling the scrambled data.

14. A combined computer and decoder system as claimed in claim 1, wherein the decoder comprises a modem, the routing means being adapted to route selected messages from an application within the computer to the modem.

15. A combined computer and decoder system as claimed in claim 1, wherein the computer includes an internet browser application adapted to receive data routed by the routing means.

16. A combined computer and decoder system as claimed in claim 1, wherein the computer includes an application adapted to receive financial data routed by the routing means.

17. A combined computer and decoder system as claimed in claim 1, further comprising a television display connected to the decoder, the decoder being adapted to process received broadcast audio-visual data subsequently sent to the television display.

18. A decoder for a combined computer and decoder system, the decoder comprising routing means for identifying broadcast digital data received at the decoder, wherein the routing means is configured to route received data identified as destined for the computer to applications within the computer, the decoder further comprising a configuration application adapted to configure said routing means.

19. A combined computer and decoder system for receiving broadcast digital data transmissions, wherein the decoder comprises a routing table for identifying broadcast digital data received at the decoder, the routing table being configured to route received data identified as destined for the computer to applications within the computer, the decoder further comprising a configuration application adapted to configure said routing table.

* * * * *